United States Patent
Liu et al.

(10) Patent No.: US 8,009,522 B2
(45) Date of Patent: Aug. 30, 2011

(54) FOCUSING SERVO DEVICE, OPTICAL DISC RECORDING/REPRODUCING DEVICE AND FOCUS-SEARCHING METHOD

(75) Inventors: Chun-Nan Liu, Sinhua Township, Tainan County (TW); Shih-Hsien Liu, Yongjing Township, Changhua County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 924 days.

(21) Appl. No.: 11/198,826

(22) Filed: Aug. 4, 2005

(65) Prior Publication Data
US 2006/0262674 A1    Nov. 23, 2006

(30) Foreign Application Priority Data

May 20, 2005  (TW) ................................ 94116442 A (51) Int. Cl.
- G11B 7/00 (2006.01)
- G11B 5/09 (2006.01)
- G11B 7/125 (2006.01)

(52) U.S. Cl. ............... 369/44.11; 369/47.27; 369/47.29; 369/53.28

(58) Field of Classification Search ............... 369/47.27, 369/47.29, 53.28, 44.11
See application file for complete search history.

(56) References Cited

U.S. PATENT DOCUMENTS

| | | | | |
|---|---|---|---|---|
| 5,408,454 A | * | 4/1995 | Hasegawa | 369/44.25 |
| 5,432,771 A | * | 7/1995 | Shido et al. | 369/126 |
| 5,912,867 A | * | 6/1999 | Miyazono | 369/44.27 |
| 6,151,280 A | * | 11/2000 | Naohara et al. | 369/44.27 |
| 6,777,657 B2 | * | 8/2004 | Nishio et al. | 250/201.5 |
| 6,882,605 B1 | * | 4/2005 | Abe | 369/44.38 |
| 7,016,269 B2 | * | 3/2006 | Ogasawara et al. | 369/44.25 |
| 7,126,899 B2 | * | 10/2006 | Ichimura et al. | 369/94 |
| 7,200,088 B2 | * | 4/2007 | Worthington et al. | 369/53.31 |
| 7,242,645 B2 | * | 7/2007 | Takahashi et al. | 369/44.29 |
| 7,522,482 B2 | * | 4/2009 | Tateishi et al. | 369/44.11 |
| 2005/0128898 A1 | * | 6/2005 | Hayashi et al. | 369/44.28 |

FOREIGN PATENT DOCUMENTS

TW    92118777    7/1992

* cited by examiner

Primary Examiner — Craig A. Renner
Assistant Examiner — Aneeta Yodichkas
(74) Attorney, Agent, or Firm — J.C. Patents (57) ABSTRACT

A focusing servo device, an optical disc recording/reproducing device and a focus-searching method are provided for making a focus of an energy beam emitted by a pick-up unit to fall in an accessible range of a data layer of a disc. The method comprises the following steps: recording the deviation of the focal point during each predetermined period when the focal point of the energy beam is fallen in the accessible range such that the optical disc recording/reproducing device is operated in a feedback control mode; determining a focus-searching range based on the recorded deviation of the focal point; and moving the focal point in the focus-searching range to make the focal point to fall in the accessible range when the focal point of the energy beam is fallen out of the accessible range such that the optical disc recording/reproducing device is operated in a focus-searching mode.

21 Claims, 5 Drawing Sheets

FOCUSING SERVO DEVICE, OPTICAL DISC RECORDING/REPRODUCING DEVICE AND FOCUS-SEARCHING METHOD

CROSS-REFERENCE TO RELATED APPLICATION

This application claims the priority benefit of Taiwan application serial no. 94116442 filed on May 20, 2005. All disclosure of the Taiwan application is incorporated herein by reference.

BACKGROUND OF THE INVENTION

1. Field of the Invention

The present invention relates to an optical disc recording/reproducing device, and more particularly, to an optical disc recording/reproducing device and a method thereof for promptly re-focusing the focal point after the first focusing was completed and the focal point is defocused again.

2. Description of the Related Art

Figure 1A:
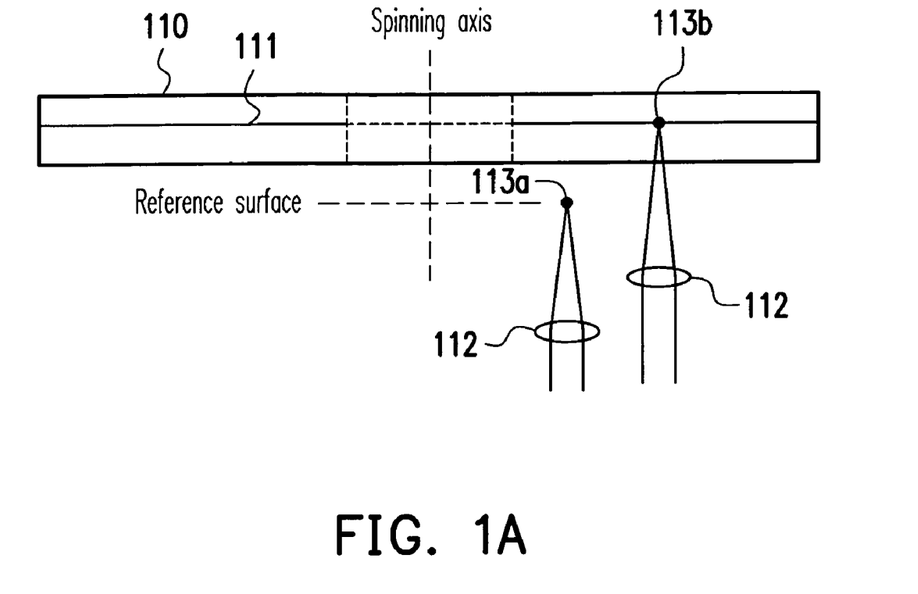
FIGS. 1A and 1B schematically show the relationship of the relative position between the focal point of the optical pick-up unit and the data layer in the optical disc.
Figure 1B:
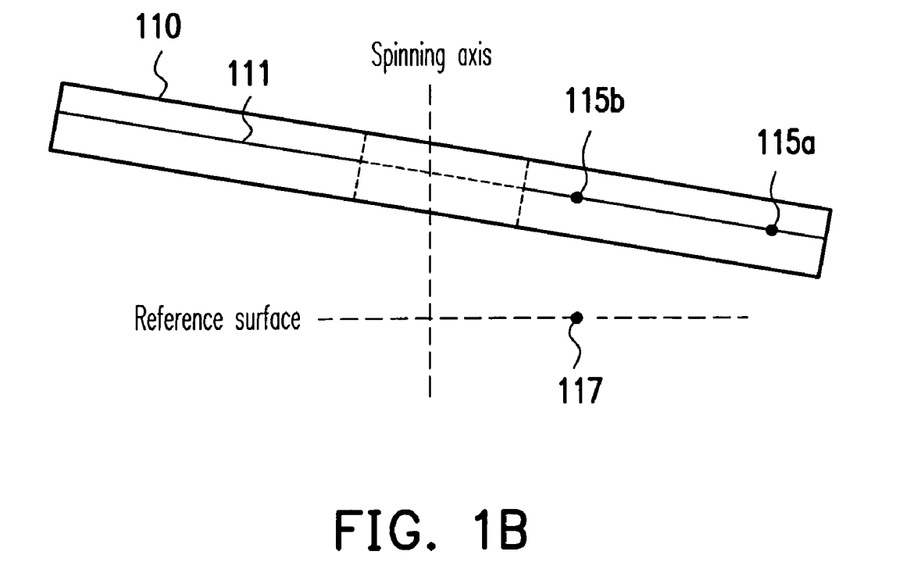

FIGS. 1A and 1B schematically show the relationship of the relative position between the focal point of the optical pick-up head and the data layer in the optical disc. Referring to FIG. 1A, the conventional optical disc recording/reproducing device needs to focus the light beam generated by the optical pick-up head onto the data layer 111 of the optical disc 110 (e.g. the focal point 113b shown in the diagram) before performing the subsequent data reading (also known as reproduce) operation. However, during the data reading, the focal point 113b, which had been focused on the data layer 111, may depart from its accessible range due to various factors such as defects on the optical disc 110, deviation on the spinning axis direction or the external force interference. Meanwhile, the optical pick-up head has to perform the focusing operation again, that is to pull down the focal point generated by the optical pick-up head below the data layer 111 (e.g. pull down the focusing point generated by the optical pick-up head to the focal point 113a) and then to push up the focal point generated by the optical pick-up head. When the focal point approaches the data layer 111 and has entered into a linear control area of the error focusing, the optical disc recording/reproducing device immediately enters into a closed-loop control loop for accomplishing the focusing operation. Wherein, the details of the linear control area of the error focusing and the closed-loop control loop are described in greater detail hereinafter.

However, since the degree of deviation of the optical disc 110 on the spinning axis direction is uncertain, the conventional method directly pulls the optical pick-up head down to a lowest position allowable by the mechanism of the optical pick-up head, and the optical pick-up head up is pushed up again to perform the focusing operation. In general, in a case where the data layer 111 of the optical disc 110 is already on the lowest position, the lowest position allowable by such mechanism is sufficient for the optical pick-up head to perform the focusing operation. In addition, the data layer 111 is usually on the outer edge of the optical disc 110 when it is on the lowest position as mentioned above. Referring to FIG. 1B, when the optical disc 110 is deviating on the spinning axis direction, the reference surface of the data layer 111 on the outer edge 115a is lower than the reference surface on the inner edge 115b, wherein the reference surface is perpendicular to the spinning axis. Use the inner edge 115b of the data layer 111 as an example. When the focal point departs from the accessible range and the optical pick-up head needs to be re-focused, the conventional technique first pulls the focal point generated by the optical pick-up head down to the lowest position allowable by the mechanism (e.g. the position 117 shown in the diagram) and then pulls the focal point generated by the optical pick-up head up to the position of the inner edge 115b. Accordingly, every time when the focal point is departed from the accessible range, the conventional focus-searching mechanism takes a certain period of time, resulting a great part of the time is wasted from the data reading is interrupted until it resumes.

SUMMARY OF THE INVENTION

Therefore, it is an object of the present invention to provide a focusing servo device and an optical disc recording/reproducing device for reducing the time period from the data reading is interrupted until the data reading resumes, that is to promptly re-focus the focal point when the first focusing was completed and the focal point is defocused again.

It is another object of the present invention to provide a focus-searching method for shortening the time period from the data reading is interrupted until the data reading resumes, that is to promptly re-focus the focal point when the first focusing was completed and the focal point is defocused again.

The present invention provides a focusing servo device for making a focal point of an energy beam (e.g. a light beam) emitted by a pick-up unit to fall in an accessible range of a data layer of a disc (e.g. an optical disc) on the spinning axis direction, so as to record/reproduce data on the optical disc. Wherein, the pick-up unit further detects an energy beam reflected from the optical disc, and generates a detection result based on the received energy beam. In addition, the focusing servo device comprises a driving unit, a focus-searching range decision unit, and a focusing control unit.

Wherein, the driving unit receives a control signal and provides a driving signal to the pick-up unit based on the received control signal, such that the focal point of the energy beam emitted by the pick-up unit is moved on the spinning axis direction of the optical disc. The focus-searching range decision unit receives the control signal and outputs a focus-searching range value by calculating an extremum of the deviation for each predetermined period based on the received control signal. Wherein, the predetermined period is a required time period for the optical disc to spin a round. The focus control unit receives the detection result and provides the control signal to the driving unit. When the detection result indicates that the focal point of the energy beam falls in the accessible range, the focusing control unit is operated in a feedback control mode, such that the control signal is adjusted and provided based on the detection result. In addition, when the detection result indicates that the focal point of the energy beam falls out of the accessible range, the focusing control unit is operated in a focus-searching mode, such that the control signal is adjusted and outputted based on the focus-searching range value. Accordingly, the driving unit controls the pick-up unit to search the focal point in a focus-searching range above/below the data layer of the optical disc on the spinning axis direction, such that the focal point of the energy beam is fallen in the accessible range.

In the focusing servo device according to a preferred embodiment of the present invention, the focus-searching range decision unit mentioned above comprises an extractor and a calculator. Wherein, the extractor extracts the control signal. The calculator calculates an extremum (e.g. a relative maximum value and a relative minimum value) of the deviation of the optical disc during each predetermined period based on the control signal extracted by the extractor, so as to output the focus-searching range value. In addition, the focus-searching range value is determined according to a focus-searching upper limit and a focus-searching lower limit. Wherein, the calculator adds a protected prepositive amount to the relative maximum value, so as to obtain the focus-searching upper limit; and subtracts the protected prepositive amount from the relative minimum value, so as to obtain the focus-searching lower limit.

The present invention provides an optical disc recording/reproducing device. The optical disc reproducing/reproducing device comprises a pick-up unit and a focusing servo device mentioned above. Wherein, the pick-up unit makes the focal point of the light beam emitted by the pick-up unit to fall on the data layer of the optical disc, detects a light beam reflected from the optical disc and generates a detection result based on the reflected light beam.

The present invention provides a focus-searching method for making the focal point of the energy beam (e.g. the light beam) in a disc recording/reproducing device (e.g. an optical disc recording/reproducing device) to fall in an accessible range of a data layer in a disc (e.g. an optical disc) on the spinning axis direction, so as to record/reproduce the data on the optical disc. The focus-searching method comprises recording the deviation of the focal point of the energy beam for every predetermined period during the focal point of the energy beam falling in the accessible range of the data layer in the disc so that the optical disc recording/reproducing device is operated in a feedback control mode; determining a focus-searching range according to the recorded deviation of the focal point of the energy beam; and moving the focal point of the energy beam in the focus-searching range to make the focal point of the energy beam to fall in the accessible range of the data layer in the disc when the focal point of the energy beam falls out of the accessible range of the data layer in the disc so that the optical disc recording/reproducing device is operated in a focus-searching mode.

In summary, the present invention uses the focus-searching range decision unit to record an extremum of the deviation of the optical disc during each predetermined period, and outputs a focus-searching range value based on the recorded extremum. Accordingly, after the first focusing was completed and the focal point is defocused again, the present invention based on the focus-searching range value searches the focal point in a range smaller than the one in the conventional technique, such that the focal point is promptly refocused.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION PREFERRED EMBODIMENTS

In order to describe the embodiment of the present invention more clearly, an optical disc recording/reproducing device is used as the disc recording/reproducing device, an optical disc is used as the disc, and a light beam is used as the energy beam hereinafter.

Figure 2:
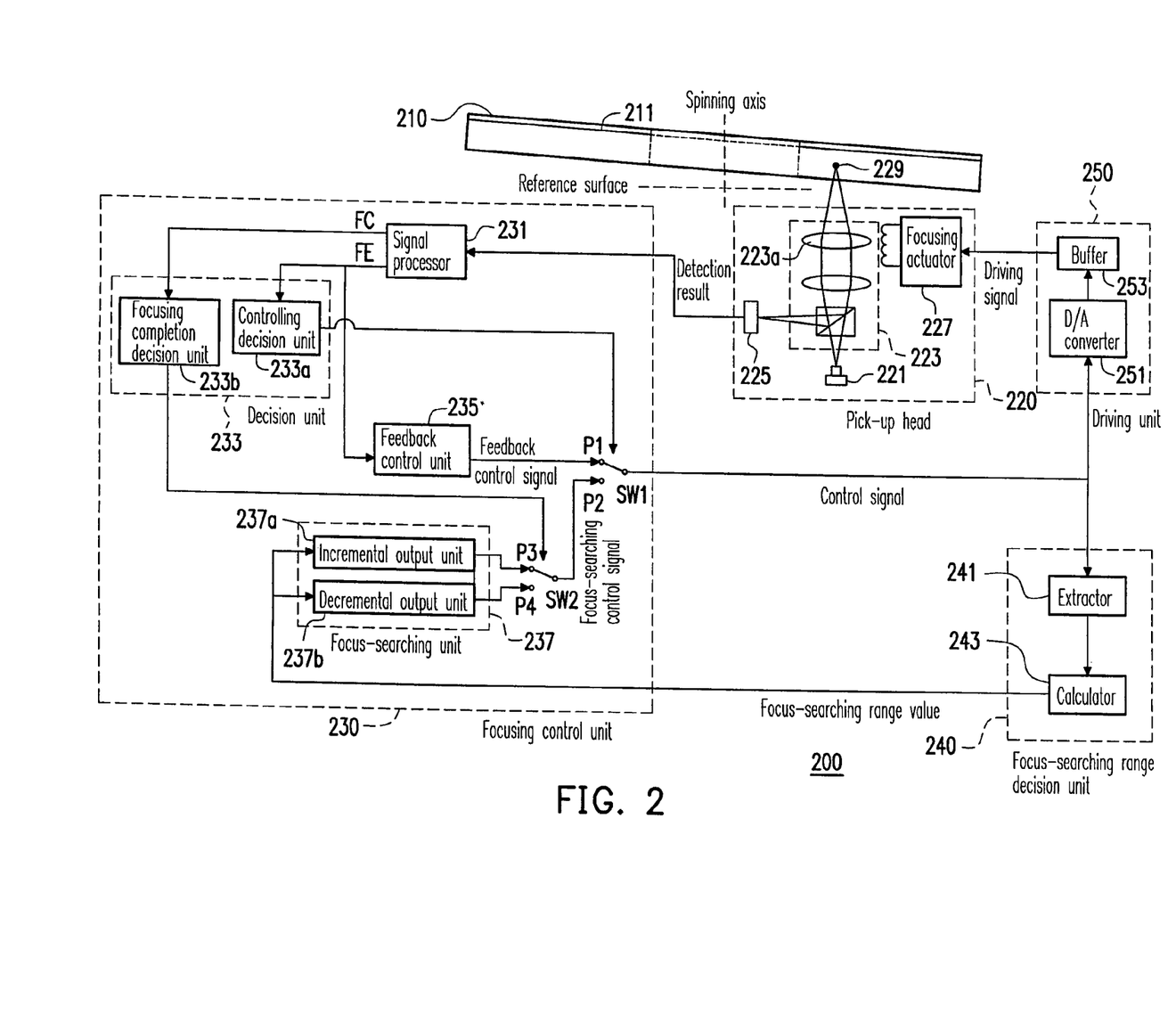
FIG. 2 schematically shows a circuit diagram of a focusing servo device in an optical disc recording/reproducing device according to a preferred embodiment of the present invention.

FIG. 2 schematically shows a circuit diagram of a focusing servo device in an optical disc recording/reproducing device according to a preferred embodiment of the present invention. Referring to FIG. 2, the focusing servo device in the optical disc recording/reproducing device 200 controls and makes a focal point 229 of the light beam emitted by a pick-up unit 220 to fall on a data layer 211 of an optical disc 210, so as to record data on the optical disc 210 or receives a light beam reflected from the data layer 211, so as to read (or reproduce) data from the optical disc 210. The focusing servo device comprises a focusing control unit 230, a focus-searching range decision unit 240 and a driving unit 250. Wherein, the focusing control unit 230 comprises a signal processor 231, a decision unit 233, a feedback control unit 235, a focus-searching unit 237 and switches SW1 and SW2. The focus-searching range decision unit 240 comprises an extractor 241 and a calculator 243. The driving unit 250 comprises an digital-to-analog (D/A) converter 251 and a buffer 253.

When it is intended to reproduce data from the optical disc 210, first, a semiconductor laser 221 of the pick-up unit 220 emits a light beam, and the light beam passes through a lens set 223, such that the focal point 229 of the light beam falls on the data layer 211. Then, a light beam reflected from the data layer 211 is transmitted to a light sensor 225 via the lens set 223, wherein the light sensor 225 converts the optical signal into an electrical signal. The signal processor 231 processes the detection result provided by the light sensor 225 and outputs a focusing error signal FE and a focusing completion signal FC. In addition, a focusing actuator 227 adjusts the position of an object lens 223a in the lens set 223 based on the driving signal provided by the driving unit 250, that is to adjust the position of the focal point 229. Wherein, the object lens 223a is a lens for generating the focal point 229 in the lens set 223 of FIG. 2.

Figure 3:
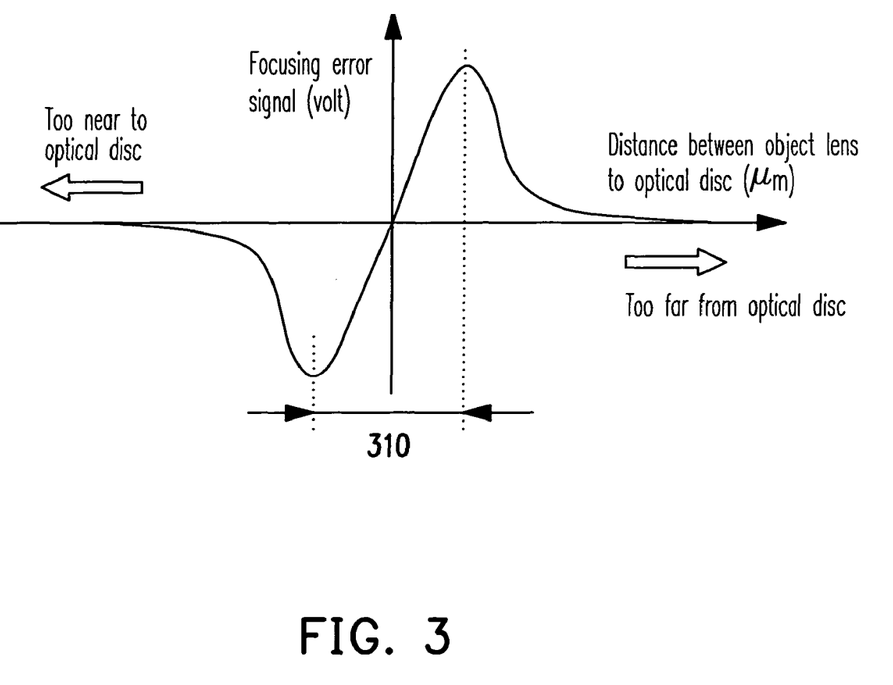
FIG. 3 schematically shows a curve diagram illustrating the relationship between the focusing error signal and the distance from the object lens to the optical disc.

FIG. 3 schematically shows a curve diagram illustrating the relationship between the focusing error signal and the distance from the object lens 223a to the optical disc 210. Referring to FIG. 2 and FIG. 3, when the object lens 223a approaches the optical disc 210 and makes the focusing error signal FE to fall in the linear range 310, the focusing servo device is switched to the feedback control mode, where a negative feedback control is performed by applying the linear relationship, so as to control the pick-up unit 220 to put the generated focal point 229 roughly on the data layer 211, or to put the generated focal point 229 in the accessible range of the data layer 211. Once the optical disc 210 is deviating due to some factors and thus causes the focusing error signal FE depart from the linear range 310 (i.e. when the focal point 229 is departed from the accessible range of the data layer 211), the focusing servo device is switched to the focus-searching mode, so as to readjust the position of the focal point 229. Wherein, the width of the linear range 310 is depends on disc type.

Referring to FIG. 2, the controlling decision unit 233a in the decision unit 233 determines the operating mode of the focusing servo device based on whether if the focusing error signal FE falls in the linear range 310. In the present invention, when the focusing error signal FE falls in the linear range 310, it is determined that the focusing servo device is operated in the feedback control mode, and the switch SW1 is switched to P1, thus a closed-loop control loop is formed by the pick-up unit 220, the signal processor 231, the feedback control unit 235 and the driving unit 250. When the focusing error signal FE falls out of the linear range 310 (also known as defocusing), it is determined that the focusing servo device is operated in the focus-searching mode, and the switch SW1 is switched to P2, thus an opened-loop control loop is formed by the focus-searching unit 237, the driving unit 250 and the pick-up unit 220.

In an embodiment of the present invention, when the focusing servo device is operated in the feedback control mode, the feedback control unit 235 outputs a feedback control signal as a control signal. Meanwhile, the focus-searching range decision unit 240 extracts the control signal from the extractor 241, provides the extracted control signal to the calculator 243 in order to calculate an extremum (e.g. the relative maximum value and the relative minimum value) of the deviation of the optical disc 210 during each predetermined period, and outputs a focus-searching range value based on the extremum. In general, since the control signal is extracted in a state where the focusing is completed, if such extremum is used for focus-searching directly, an incomplete focusing error signal may be generated as shown in the positive peak value or the negative peak value of FIG. 3, which causes a mis-determination of the linear range 310. Therefore, it is required to further add/subtract a protected prepositive amount for its further protection. For example, the protected prepositive amount is added to the relative maximum value to obtain a focus-searching upper limit; and the protected prepositive amount is subtracted from the relative minimum value to obtain a focus-searching lower limit. Wherein, the focus-searching range value indicates that the focus-searching range is between the focus-searching upper limit and the focus-searching lower limit.

The focus-searching unit 237 comprises an incremental output unit 237a and a decremental output unit 237b. Wherein, the incremental output unit 237a adjusts and moves the focal point 229 upward on the spinning axis direction, whereas the decremental output unit 237b adjusts and moves the focal point 229 downward on the spinning axis direction. When the focusing servo device is operated in the focus-searching mode, the focusing completion signal FC, which is provided by the signal processor 231 after the detection result is processed, indicates the focusing is failed. Meanwhile, the focusing completion decision unit 233b activates the focus-searching unit 237 to output a focus-searching control signal as a control signal, and the switch SW2 is switched to P3, thus the incremental output unit 237a provides a control signal to move the focal point 229 upward. Meanwhile, if the focal point 229 has not been fallen in the accessible range of the data layer 211, it is limited by the focus-searching range value. Then, the focal point 229 is moved upward to the maximum value (i.e. the focus-searching upper limit), and the switch SW2 switches to P4. Afterwards, the decremental output unit 237b provides a control signal to move the focal point 229 downward. Meanwhile, if the focal point 229 has not been fallen in the accessible range of the data layer 211, it is limited by the focus-searching range value. Then, the focal point 229 is moved downward to the minimum value (i.e. the focus-searching minimum value), and the focus-searching unit 237 controls and moves the focal point 229 upward again.

Accordingly, the operations mentioned above are repeated until the focal point 229 is fallen in the accessible range of the data layer 211.

In addition, the control signal is normally a digital signal. Therefore, a digital-to-analog (D/A) converter 251 is required in the driving unit 250 to convert the digitalized control signal into an analog signal, such that the analog signal can be transmitted to the focusing actuator 227 via the buffer 253 for adjusting the position of the object lens 223a.

Figure 4:
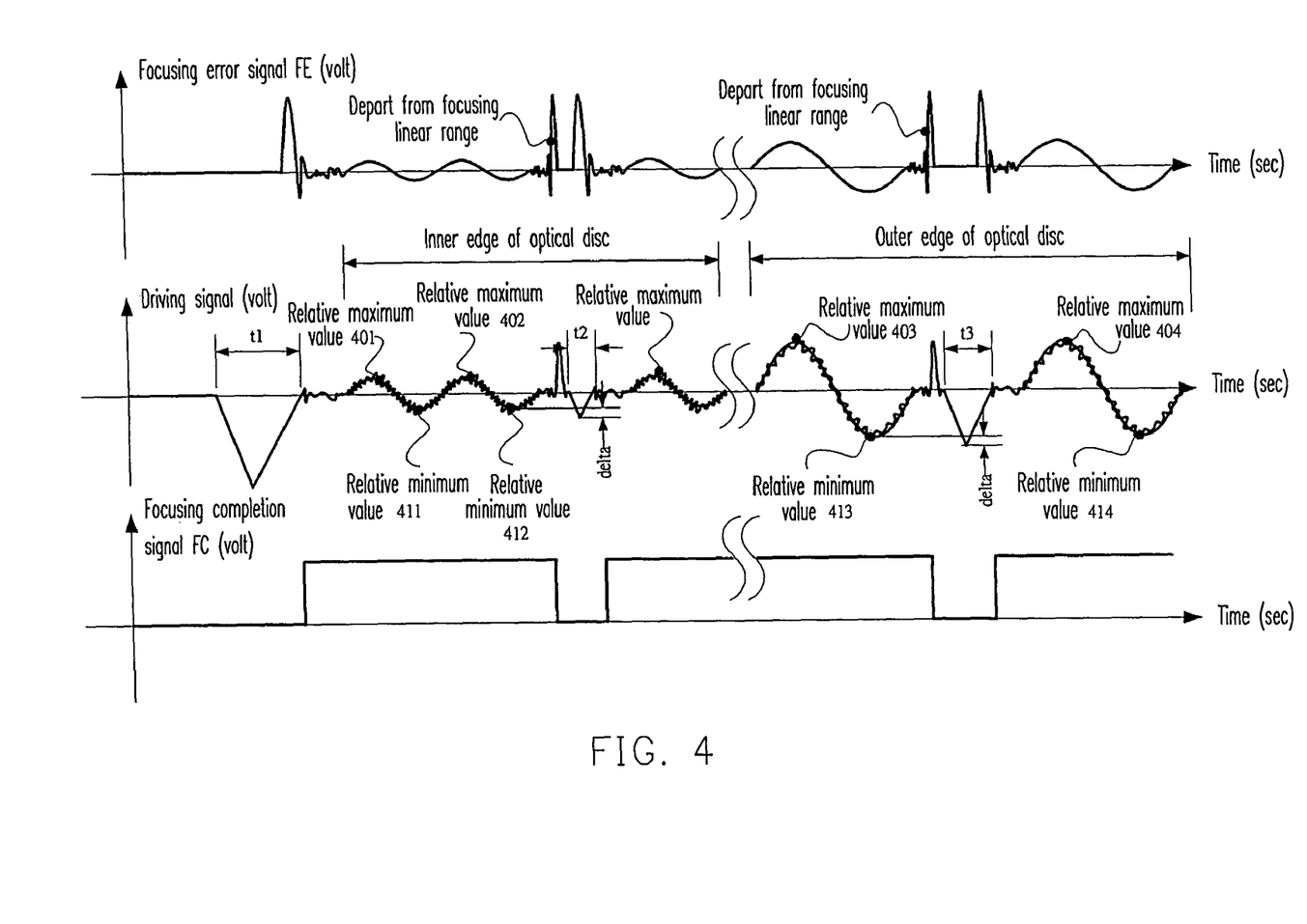
FIG. 4 schematically shows a waveform diagram of the focusing error signal, the focusing completion signal, and the driving signal according to the preferred embodiment of the present invention.

FIG. 4 schematically shows a waveform diagram of the focusing error signal, the focusing completion signal and the driving signal according to the preferred embodiment of the present invention. Referring to FIG. 2 and FIG. 4, at the beginning, the focus-searching method uses the conventional technique. First, the pick-up unit 220 is driven by the driving signal to pull the focal point 229 down to the lowest position allowable by the mechanism, and the focal point 229 is then pushed up to have the focal point 229 to fall in the accessible range of the data layer 211. If the focal point 229 has not been fallen on the accessible range of the data layer 211, the focal point 229 is pushed upward to the highest position allowable by the mechanism. Wherein, a range between the lowest position and the highest position is the maximum focus-searching range. It is assumed that the maximum required time for moving the focal point 229 in the maximum focus-searching range is t1. In the prior art, the maximum focus-searching range is used in focus-searching as long as the defocusing is happened; thus a lot of unnecessary focus-searching time is wasted when a defocusing is occurred while reading the inner edge of the optical disc 210 because such big focus-searching range is not necessary.

In the present embodiment, after the first focusing has been completed, since the focusing servo device is operated in the feedback control mode, the focus-searching range decision unit 240 extracts the control signal to calculate the extremum (e.g. the relative maximum values 401~404 and the relative minimum values 411~414) of the deviation of the optical disc 210 during each predetermined period. In case the defocusing is happened, a focus-searching range obtained by adding/subtracting a protected prepositive amount delta to/from the extremum is used for focus-searching. Wherein, the protected prepositive amount is added to the relative maximum value, and the protected prepositive amount is subtracted from the relative minimum value.

In general, since the driving signal for driving the pick-up unit 220 in the present embodiment is in simple harmonic motion (SHM), the predetermined time mentioned above is the time required for the optical disc 210 to spin for the last lap under the focusing state before it is defocused, that is the extremum required for the optical disc 210 to spin for the last lap under the focusing state before it is defocused, e.g. the extremum 402 and 412, such that the memory space is effectively saved.

In the present embodiment, when the focal point is defocused on the inner edge of the optical disc 210, the maximum time it requires for obtaining the focus-searching range by adding/subtracting the protected prepositive amount delta to/from the extremum 402 and 412 is t2 (where t2<t1). Even though when the focal point is defocused on the outer edge of the optical disc 210, the maximum time it needs to obtain the focus-searching range by adding/subtracting the protected prepositive amount delta to/from the extremum 403 and 413 is t3, where t3 is smaller than t1, and t1 is the time required in the prior art (t2<t3<t1). Accordingly, it effectively shortens the time period from the data reading is interrupted until it resumes. In other words, it is possible to promptly refocus the focal point after the first focusing was completed and the focal point is defocused again. In addition, after the focal point 229 has fallen in the accessible range of the data layer 211 for a certain period of time, the focusing completion signal FC will indicate that the focusing is successful (e.g. logic high).

Figure 5:
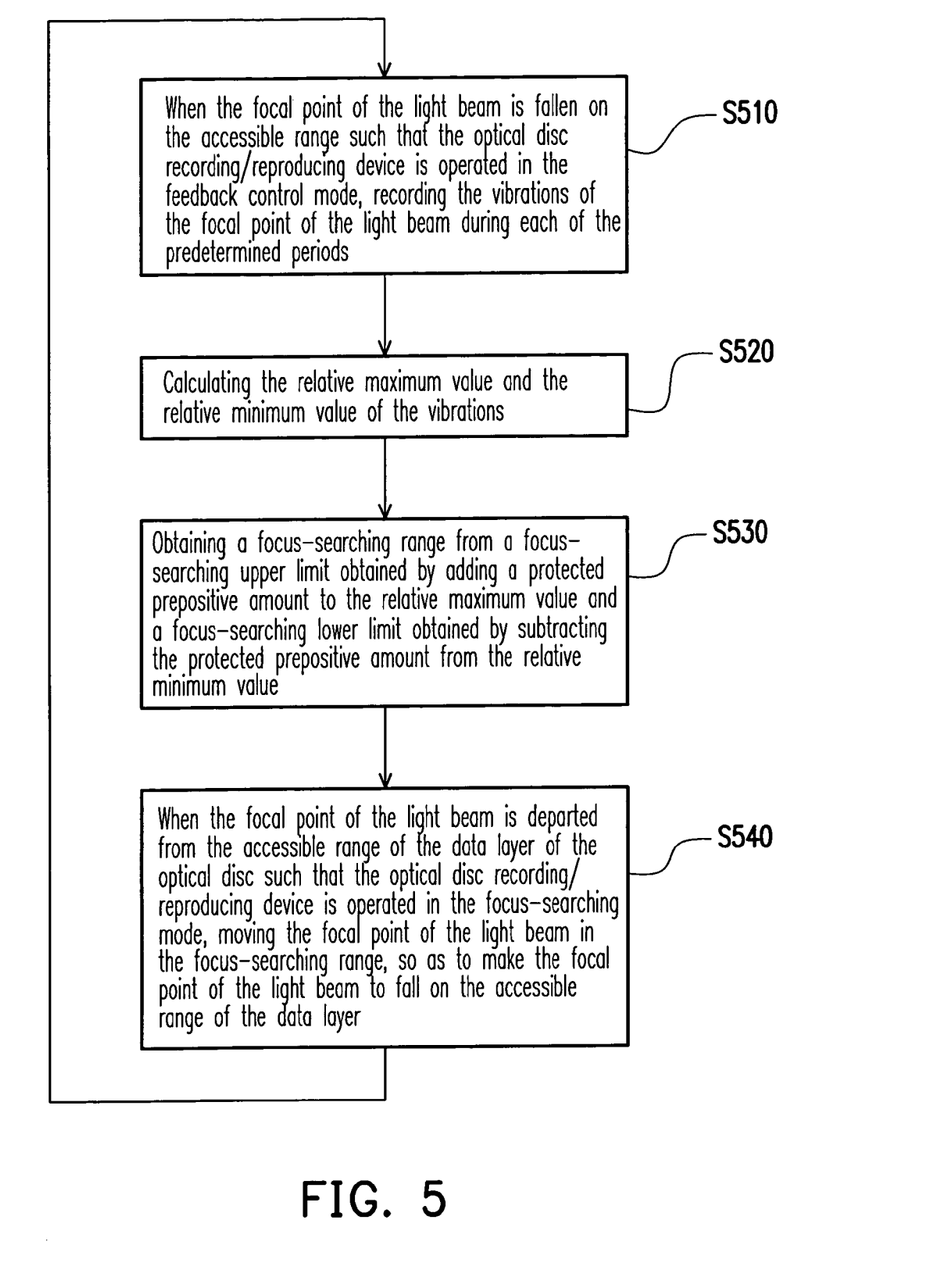
FIG. 5 schematically shows a flow chart illustrating a focus-searching method according to a preferred embodiment of the present invention.

FIG. 5 schematically shows a flow chart illustrating a focus-searching method according to a preferred embodiment of the present invention. Referring to FIG. 2 and FIG. 5, the focus-searching method is suitable for an optical disc recording/reproducing device 200 when the first focusing was completed and the focal point is defocused again. In step S510, during the focal point 229 of the light beam is fallen in the accessible range of the data layer 211 (i.e. the focusing error signal FE is fallen within the linear range) such that the optical disc recording/reproducing device 200 is operated in a feedback control mode; the deviation of the focal point 229 of the light beam for every predetermined period are recorded, wherein the predetermined period is the required time for the optical disc 210 to spin a round. Then, in step S520, some characteristic values of the deviation, such as the relative maximum values and the relative minimum values are calculated.

In step S530, a focus-searching range is determined based on the recorded deviation. For example, a focus-searching upper limit is obtained by adding the protected prepositive amount to the relative maximum value, and a focus-searching lower limit is obtained by subtracting the protected prepositive amount from the relative minimum value. Accordingly, the focus-searching range is obtained from the focus-searching upper limit and the focus-searching lower limit. In step S540, when the focal point 229 of the light beam is departed from the accessible range of the data layer 211 such that the optical disc recording/reproducing device 200 is operated in the focus-searching mode, the focal point 229 of the light beam is moved within the focus-searching range mentioned above, so as to make the focal point 229 of the light beam to fall in the accessible range of the data layer 211. Then, steps S510~S540 are repeated, such that the focal point 229 is promptly refocused and roughly fallen on the data layer 211 even the focal point 229 may be defocused again.

In summary, the present invention records the extremum of the deviation of the optical disc during each predetermined period and outputs a focus-searching range value according to the recorded extremum. Accordingly, after the first focusing was completed and the focal point is defocused again, the present invention based on the focus-searching range value promptly refocuses the focal point in a range smaller than the one used in the prior art.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A focusing servo device, for a focal point of an energy beam emitted by a pick-up unit to fall in an accessible range of a data layer in an disc on a spinning axis direction for data recording and/or reproducing, wherein the pick-up unit further detects an energy beam reflected from the disc and generates a detection result, the focusing servo device comprising:
    a focusing control unit, receiving the detection result detected from the energy beam as the energy beam being emitted to the disc for data recording and/or reproducing, and providing the control signal based on the detected result to the driving unit when the focusing control unit is operated in a feedback control mode;
    a driving unit, for receiving the control signal and providing a driving signal to the pick-up unit based on the received control signal, such that the focal point of the energy beam emitted by the pick-up unit moves on the spinning axis direction of the disc; and
    a focus-searching range decision unit, receiving the control signal applied to the driving unit and calculating extremums of the deviation of the disc during a predetermined period based on the received control signal for recording the extremums when the focusing control unit is operated in the feedback control mode, and outputting a focus-searching range to the focusing control unit to adjust the control signal according to the recorded extremums of the deviation of the disc during the predetermined period in the feedback control mode;
    wherein, when the detection result indicates that the focal point of the energy beam is fallen in the accessible range while a relationship between a focusing error signal of the detection result and a distance from a object lens to the disc is in a linear range, the focusing control unit is operated in the feedback control mode for adjusting and outputting the control signal based on the detection result, and
    when the detection result indicates the focal point of the energy beam is out of the accessible range while the relationship is out of the linear range, the focusing control unit is operated in a focus-searching mode for adjusting and outputting the control signal based on the focus-searching range, and the focal point of the energy beam is moved in the focus-searching range output in the feedback control mode, such that the driving unit controls the pick-up unit to search the focal point in a focus-searching range above/below the data layer of the disc on the spinning axis direction of the disc for making the focal point of the energy beam to fall in the accessible range.

2. The focusing servo device of claim 1, wherein the extremums comprise a relative maximum value and a relative minimum value, and the focus-searching range decision unit comprises:
    an extractor for extracting the control signal; and
    a calculator for calculating the relative maximum value and the relative minimum value of the deviation of the disc during the predetermined period based on the control signal extracted by the extractor for outputting the focus-searching range.

3. The focusing servo device of claim 2, wherein the calculator adds a protected prepositive value to the relative maximum value for obtaining a focus-searching upper limit, and subtracts the protected prepositive value from the relative minimum value for obtaining a focus-searching lower limit, and outputs the focus-searching range based on the focus-searching upper limit and the focus-searching lower limit.

4. The focusing servo device of claim 1, wherein the predetermined period is a required time period for the disc to spin in a round.

5. The focusing servo device of claim 1, wherein the extremums are obtained based on the control signal during the feedback control mode.

6. The focusing servo device of claim 1, wherein during the first focusing, the focusing servo device controls the pick-up unit to search the focal point in a maximum focus-searching range above/below the data layer of the disc on the spinning axis direction of the disc based on an initial range of the focus-searching range.

7. The focusing servo device of claim 1, wherein the focusing servo device is suitable for an optical disc recording/reproducing device, the disc comprises an optical disc, and the energy beam comprises a light beam.

8. The focusing servo device of claim 7, wherein the focusing control unit comprises:
   a feedback control unit for generating and adjusting a feedback control signal based on the detection result provided by the pick-up unit;
   a focus-searching unit for generating and adjusting a focus-searching control signal based on the focus-searching range provided by the focus-searching range decision unit and based on the detection result; and
   a decision unit for determining whether the focusing control unit is operated in the feedback control mode or in the focus-searching mode based on the detection result,
   wherein, when the focusing control unit is operated in the feedback control mode, the focusing control unit outputs the feedback control signal as the control signal; and when the focusing control unit is operated in the focus-searching mode, the focusing control unit outputs the focus-searching signal as the control signal.

9. The focusing servo device of claim 8, wherein the focus-searching unit comprises:
   an incremental output unit, for adjusting an upward control signal according to the focus-searching range, the upward control signal being adapted for moving the focal point of the energy beam upward on the spinning axis direction;
   a decremental output unit, for adjusting a downward control signal, the downward control signal being adapted for moving the focal point of the energy beam downward on the spinning axis direction,
   wherein when the focusing control unit is operated in the focus-searching mode, whether the focusing-searching signal is the downward control signal or the upward control signal is determined by the detection result.

10. The focusing servo device of claim 1, wherein the driving unit further comprises:
   a digital-to-analog (D/A) converter for converting the digitalized control signal into an analog driving signal; and
   a buffer electrically coupled to the D/A converter for buffering and outputting the driving signal.

11. An optical disc recording/reproducing device, comprising:
   a pick-up unit for making a focal point of one light beam emitted by the pick-up unit to fall on a data layer of an optical disc, detecting a reflected light beam reflected from the optical disc as the one light beam is emitted upon the disc, and generating a detection result based on the reflected light beam; and
   a focusing servo device, comprising:
   a focusing control unit, receiving the detection result detected from the reflected energy beam as the energy beam being emitted from the pick-up unit to the disc for data recording and/or reproducing and providing the control signal to the driving unit when the focusing control unit is operated in a feedback control mode;
   a driving unit, receiving the control signal and providing a driving signal to the pick-up unit based on the control signal, such that the focal point of the light beam emitted by the pick-up unit is moved on the spinning axis direction of the optical disc; and
   a focus-searching range decision unit, receiving the control signal applied to the driving unit and calculating extremums of the deviation of the disc during a predetermined period based on the received control signal for recording the extremums when the focusing control unit is operated in the feedback control mode, and outputting a focus-searching range to the focusing control unit to adjust the control signal according to the recorded extremums of the deviation of the disc during the predetermined period in the feedback control mode,
   wherein, when the detection result indicates that the focal point of the light beam is fallen in an accessible range above/below the data layer of the optical disc on the spinning axis direction of the optical disc while a relationship between a focusing error signal of the detection result and a distance from a object lens to the disc is in a linear range, the focusing control unit is operated in the feedback control mode for adjusting and outputting the control signal based on the detection result; and when the detection result indicates that the focal point of the light beam is out of the accessible range while the relationship is out of the linear range, the focusing control unit is operated in a focus-searching mode for adjusting and outputting the control signal based on the focus-searching range output in the feedback control mode, and the focal point of the energy beam is moved in the focus-searching range, such that the driving unit controls the pick-up unit to search the focal point within a focus-searching range above/below the data layer of the optical disc on the spinning axis direction of the optical disc for making the focal point of the light beam to fall in the accessible range.

12. The optical disc recording/reproducing device of claim 11, wherein the extremums comprise a relative maximum value and a relative minimum value, and the focus-searching range decision unit comprises:
   an extractor for extracting the control signal; and
   a calculator for calculating the relative maximum value and the relative minimum value of the deviation of the optical disc during the predetermined period based on the control signal extracted by the extractor for outputting the focus-searching range.

13. The optical disc recording/reproducing device of claim 12, wherein the calculator adds a protected prepositive value to the relative maximum value for obtaining a focus-searching upper limit, and subtracts the protected prepositive value from the relative minimum value for obtaining a focus-searching lower limit, and outputs the focus-searching range based on the focus-searching upper limit and the focus-searching lower limit.

14. The optical disc recording/reproducing device of claim 11, wherein the predetermined period is a required time period for the optical disc to spin in a round.

15. The optical disc recording/reproducing device of claim 11, wherein the extremums are obtained based on the control signal during the feedback control mode.

16. The optical disc recording/reproducing device of claim 11, wherein during the first focusing, the focusing servo device controls the pick-up unit to search the focal point within a maximum focus-searching range above/below the data layer of the optical disc on the spinning axis direction of the optical disc based on an initial range of the focus-searching range.

17. A focus-searching method for making a focal point of an energy beam in an disc recording/reproducing device to fall in an accessible range of a data layer of an disc on a spinning axis direction of the disc for performing data recording and/or reproducing, the focus-searching method comprising:
   when the focal point of the energy beam is fallen in the accessible range while a relationship between a focusing error signal of the detection result and a distance from a object lens to the disc is in a linear range such that the disc recording/reproducing device being operated in a feedback control mode, recording a position deviation of the focal point of the energy beam during the predetermined period, determining a focus-searching range based on the recorded position deviation of the focal point of the energy beam in the feedback control mode, wherein the focus-searching range is determined by a focus-searching upper limit and a focus-searching lower limit determined by the position deviation; and when the focal point of the energy beam is departed from the accessible range of the data layer in the disc while the relationship is out of the linear range such that the disc recording/reproducing device being operated in a focus-searching mode, moving the focal point of the energy beam in the focus-searching range determined in the feedback control mode for making the focal point of the energy beam to fall in the accessible range of the data layer in the disc.

18. The focus-searching method of claim 17, wherein the step of recording the position deviation of the focal point of the energy beam during the predetermined period comprises recording a relative maximum value and a relative minimum value of the deviation.

19. The focus-searching method of claim 18, wherein the step of recording the position deviation of the focal point of the energy beam during the predetermined period further comprises:

adding a protected prepositive value to the relative maximum value for obtaining the focus-searching upper limit;

subtracting the protected prepositive value from the relative minimum value for obtaining the focus-searching lower limit; and obtaining the focus-searching range based on the focus-searching upper limit and the focus-searching lower limit.

20. The focus-searching method of claim 17, wherein the predetermined period is a required time period for the disc to spin in a round.

21. The focus-searching method of claim 17, wherein the disc recording/reproducing device comprises an optical disc recording/reproducing device, the disc comprises an optical disc, and the energy beam comprises a light beam.

* * * * *